United States Patent
Stafford

(10) Patent No.: US 12,491,845 B2
(45) Date of Patent: Dec. 9, 2025

(54) TRAILER BRAKE

(71) Applicant: Roger D Stafford, Mountain View, AR (US)

(72) Inventor: Roger D Stafford, Mountain View, AR (US)

(*) Notice: Subject to any disclaimer, the term of this patent is extended or adjusted under 35 U.S.C. 154(b) by 390 days.

(21) Appl. No.: 18/223,874

(22) Filed: Jul. 19, 2023

(65) Prior Publication Data
US 2025/0026319 A1 Jan. 23, 2025

(51) Int. Cl.
*B60T 1/14* (2006.01)
*B60B 33/00* (2006.01)

(52) U.S. Cl.
CPC .......... *B60T 1/14* (2013.01); *B60B 33/0089* (2013.01)

(58) Field of Classification Search
CPC ......... B60T 1/14; B60T 3/00; B60B 33/0089; B62D 63/08; Y10T 70/5836
USPC .................................................. 188/1.12, 5
See application file for complete search history.

(56) References Cited

U.S. PATENT DOCUMENTS

| | | | | |
|---|---|---|---|---|
| 2,033,207 | A * | 3/1936 | Schultz, Jr. | B60B 33/0078 16/32 |
| 2,240,399 | A * | 4/1941 | Huntington | B60T 7/20 280/493 |
| 3,504,880 | A * | 4/1970 | Toms | B60S 11/00 248/354.3 |
| 3,719,370 | A * | 3/1973 | Gintick | B62B 5/0423 280/33.994 |
| 6,183,405 | B1 * | 2/2001 | Schurig | B60B 33/021 492/45 |
| 10,960,857 | B1 * | 3/2021 | Weddle | B60T 3/00 |
| 11,346,154 | B2 * | 5/2022 | Major | E06C 7/44 |
| 11,673,427 | B2 * | 6/2023 | Lazzarino | B60B 33/0089 280/33.994 |
| 12,044,073 | B2 * | 7/2024 | Maxfield | E06C 7/42 |
| 2018/0230746 | A1 * | 8/2018 | Maxfield | E06C 7/42 |
| 2019/0360540 | A1 | 11/2019 | Ling | |
| 2020/0346490 | A1 * | 11/2020 | Li | B60B 33/0028 |
| 2022/0048320 | A1 * | 2/2022 | Lazzarino | B62B 5/049 |

* cited by examiner

Primary Examiner — Bradley T King
(74) Attorney, Agent, or Firm — Edison Law Group, PLLC

(57) ABSTRACT

A parking brake used on the tongue jack wheel of a boat trailer to keep the boat trailer from moving is disclosed. The parking brake attaches to a trailer tongue jack wheel assembly that is standard on most boat trailers. The disclosed brake replaces chock blocks so those do not have to be transported with the trailer.

17 Claims, 4 Drawing Sheets

TRAILER BRAKE

BACKGROUND

Technical Field

This disclosure relates to braking devices for trailers. In particular, the disclosure relates to, and without limitation, a brake for trailers with lockable armatures to secure the brake to the trailer.

Trailer braking devices are known in the art.

US 2019/0360540 describes a one-way rotating device.

EP 2 374 672 describes a parking brake for wheels, in particular for wheels of multi-purpose trolleys.

EP 2 374 672 describes a parking brake for wheels, in particular for wheels of multi-purpose trolleys.

WO 2012/066318 describes a braking device and method for braking.

While braking systems are known in the art, these systems are limited in convenience for employing a trailer tongue braking mechanism.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

SUMMARY

A parking brake used on the tongue jack wheel of a boat trailer to keep the trailer from moving is disclosed. This disclosed brake attaches to a trailer tongue jack wheel assembly that is standard on most boat trailers. The disclosed brake replaces chock blocks so those do not have to be transported with the trailer.

Other systems, methods, features and advantages of the disclosure will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
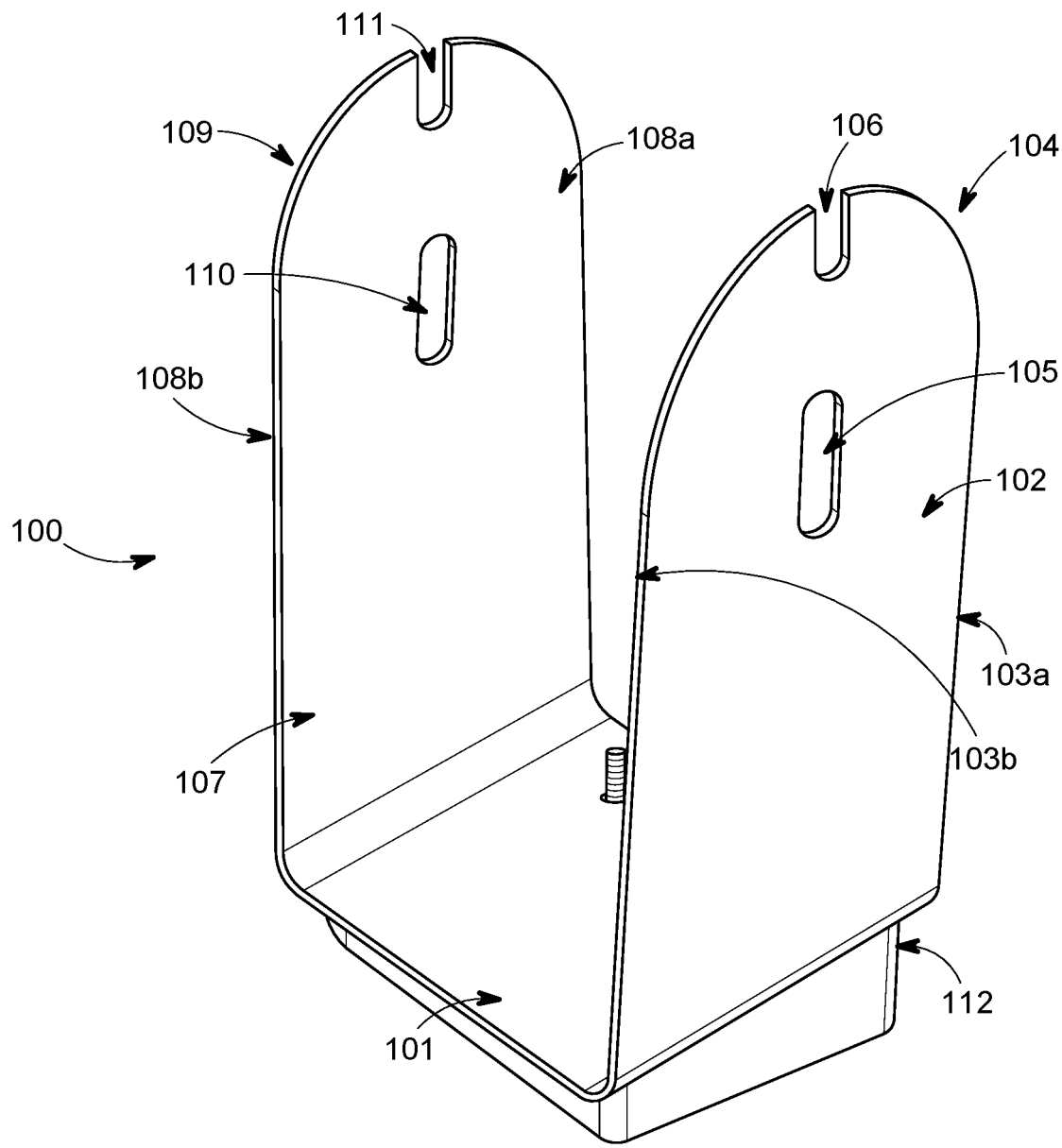
FIG. 1 is a view of a first aspect of a trailer parking brake, according to the disclosure.

A parking brake used on the tongue jack wheel of a boat trailer to keep the trailer from moving is disclosed. The parking brake includes a brake base plate connected to two adjoining armatures that couple to the tongue jack wheel through two sets of bolts. The brake base plate includes a rubber block in communication with the brake base plate to secure the assembly and prevent the trailer from movement while the brake is in use.

Various aspects of the present disclosure will be described in detail with reference to the drawings, wherein like reference numerals represent like parts and assemblies throughout the several views. Reference to various aspects does not limit the scope of the disclosure, which is limited only by the scope of the claims attached hereto. Additionally, any examples set forth in this specification are not intended to be limiting and merely set forth some of the many possible aspects for the claimed disclosure.

In describing aspects of the present disclosure, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact but may be approximated and/or larger or smaller, as desired, reflecting tolerances, conversion factors, rounding off, measurement error and the like, and other factors known to those of skill. Further, unless otherwise stated, the term "about" shall expressly include "exactly."

The terms "communicate," or "communication" refer to any component(s) connecting with any other component(s) in any combination, whether through direct physical connection, intermediary physical connection for the purpose of the connected components to communicate, interact, transfer energy or motion and/or transfer data to and from any components and/or control any settings.

In the following description, numerous specific details are set forth to clearly describe various specific aspects disclosed herein. One skilled in the art, however, will understand that the presently claimed disclosure may be practiced without all of the specific details discussed below. In other instances, well known features have not been described so as not to obscure the disclosure. As described herein, the term "pivotally connected" shall be used to describe a situation wherein two or more identified objects are joined together in a manner that allows one or both of the objects to pivot, and/or rotate about or in relation to the other object in either a horizontal or vertical manner. As described herein, the term "removably coupled" and derivatives thereof shall be used to describe a situation wherein two or more objects are joined together in a non-permanent manner so as to allow the same objects to be repeatedly joined and separated. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Furthermore, and as described in subsequent paragraphs, the specific mechanical configurations illustrated in the drawings are intended to exemplify aspects of the disclosure and that other alternative mechanical configurations are possible.

Conventional trailer brakes employ "chock blocks" to assist in securing the trailer from movement when the trailer is stopped at a location. These chock blocks need to be transported with the trailer to be used. The disclosed trailer brake eliminates the need for chock blocks and provides a convenient assembly for the trailer as a braking device.

FIG. 1 illustrates a perspective view of a trailer parking brake 100, according to an aspect of the disclosure. The trailer parking brake 100 includes a brake base 101 coupled to a first brake armature 102 and a second brake armature 107. The first brake armature 102 and the second brake armature 107 are attached to the brake base 101 at substantially perpendicular angles and extend substantially away from the brake base 101 to form a "U" shape. In an aspect, the brake base 101 is 3¼" along edges connecting the brake base 101 to the first brake armature 102 and the second brake armature 107. In aspect, the brake base 101 has a dimension of 4" along the edges not connected to the first brake armature 102 and the second brake armature 107.

The first brake armature 102 and the second brake armature 107 may be mated to the brake base 101 through joints or welds. In an aspect the first brake armature 102 and the second brake armature 107 may be a continuous metal piece with the brake base 101 and formed by bending the first brake armature 102 and the second brake armature 107 into the substantially perpendicular orientation as shown in FIG. 1.

In an aspect, the first brake armature 102 includes a first substantially straight side portion 103a and a second substantially straight side portion 103b on either side of the first brake armature 102 and a first substantially semi-circular portion 104 along a top edge of the first brake armature 102, joining the first substantially straight side portion 103a and the second substantially straight side portion 103b. The first brake armature 102 includes a first connection slot 105 within a body of the first brake armature 102. The first brake armature 102 includes a second slot 106 which is for holding the brake in the disengaged position, herein after called a retaining slot, disposed along an edge of first substantially semi-circular portion 104. The first retaining slot 106 impinges into the body of the first brake armature 102 to form an aperture within the first brake armature 102. In an aspect, the first brake armature 102 has a lateral length of 6⅛" from the brake base 101 to a distal end of the first brake armature 102. In an aspect, the first connection slot 105 has dimensions of 1" by 5/16" and a center of the first connection slot 105 positioned 1⅞" from an edge of the first substantially straight side portion 103a. In an aspect, the first retaining slot 106 has dimensions of ½" by 5/16". The dimensions provided are exemplary, and other dimensions may be contemplated or desired based on application of the device without deviating from the spirit and scope of coverage of the disclosure.

In an aspect, the second brake armature 107 includes a third substantially straight side portion 108a and a fourth substantially straight side portion 108b on either side of the second brake armature 107 and a second substantially semi-circular portion 109 along a top edge of the second brake armature 107, joining the third substantially straight side portion 108a and the fourth substantially straight side portion 108b. The second brake armature 107 includes a second connection slot 110 within a body of the second brake armature 107. The second brake armature 107 includes a second retaining slot 111 disposed along an edge of the first substantially semi-circular portion 109. The second retaining slot 111 impinges into the body of the second brake armature 102 to form an aperture within the second brake armature 107.

In an aspect, the second brake armature 107 has a lateral length of 6⅛" from the brake base 101 to a distal end of the second brake armature 107. In an aspect, the second connection slot 110 has dimensions of 1" by 5/16" and a center of the second connection slot 105 positioned 1⅞" from an edge of the second substantially straight side portion 108a. In an aspect, the second retaining slot 111 has dimensions of ½" by 5/16". The dimensions provided are exemplary, and other dimensions may be contemplated or desired based on application of the device without deviating from the spirit and scope of coverage of the disclosure.

The trailer parking brake 100 includes a trailer brake pad 112 in communication with the trailer brake base 101. The trailer brake pad 112 may be coupled to the trailer brake base 101 using fasteners such as screws or adhesives such as glue. The trailer brake pad 112 may be a rubber material to allow improved contact and friction with a surface to which the trailer parking brake 100 is applied. The trailer brake pad 112 may be formed as a substantially triangular wedge shape when viewed from a side of the trailer brake pad 112.

In an aspect, the trailer brake pad is a hard rubber 3¼" by 4" block that is tapered on the 4" side, from ½" thick to ½" thick. The ½" edge is mounted on the straight edge of the brake opposite the flange.

In a further aspect, the brake base 101, the first brake armature 102 and the second brake armature 107 are made of 16 gauge galvanized steel. Other materials are possible depending on the application and cost considerations.

Figure 2:
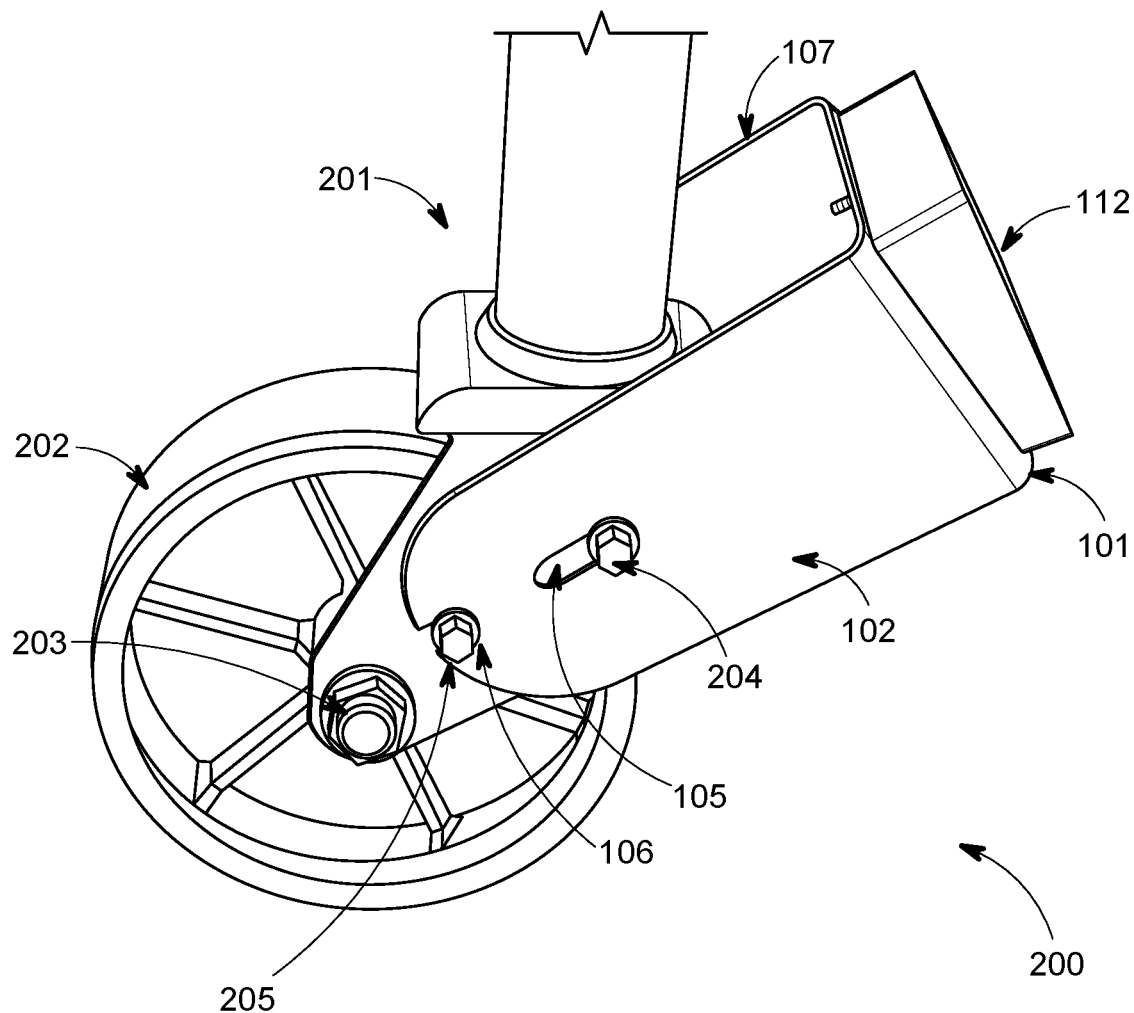
FIG. 2 is a view of a second aspect of a trailer parking brake coupled to a tongue jack wheel, according to the disclosure.

FIG. 2 shows an aspect of the trailer brake 200 coupled to a tongue jack 201 with wheel 202. The wheel 202 is coupled to the tongue jack 201 using a fastener 203, which in an aspect is a bolt securing the wheel 202 to the tongue jack 201. The trailer brake 200 serves to brake the wheel 202 of the tongue jack 201. As shown in FIG. 2, the trailer brake 200 is positioned with the trailer brake pad 112 raised off the ground so that the trailer jack 201 is not engaged. During initial installation of the trailer brake a fastener, such as first connection bolt 204, is threaded into the first connection slot 105 to secure the first brake armature 102 to the tongue jack 201 with a lock nut (not shown on opposite side of the trailer brake 200) attached to secure the first connection bolt 204 to the tongue jack 201. In an aspect, the first connection bolt 204 is sized as ½" long by ¼". Connecting bolts are permanently installed to connect the brake to the jack, and are not removed during operation. Other dimensions may be possible for different sized tongue jacks, for example.

In an aspect, a stopping bolt, such as retaining bolt 205, is threaded through and secured against edges of first retaining slot 106, securing the first brake armature 102 at a second point against the tongue jack 201 when the brake is disengaged. The retaining slots are open at the upper end. On an opposite side, not shown in FIG. 2, another stopping bolt, is threaded through and secured against edges of the second retaining slot 111, securing the second brake armature 107 to the tongue jack 201, when the brake is disengaged. Stopping (retaining) bolts are permanently installed, and are not removed during operation. Locking nuts for these bolts are installed on the inside of the wheel assembly fork.

Figure 3:
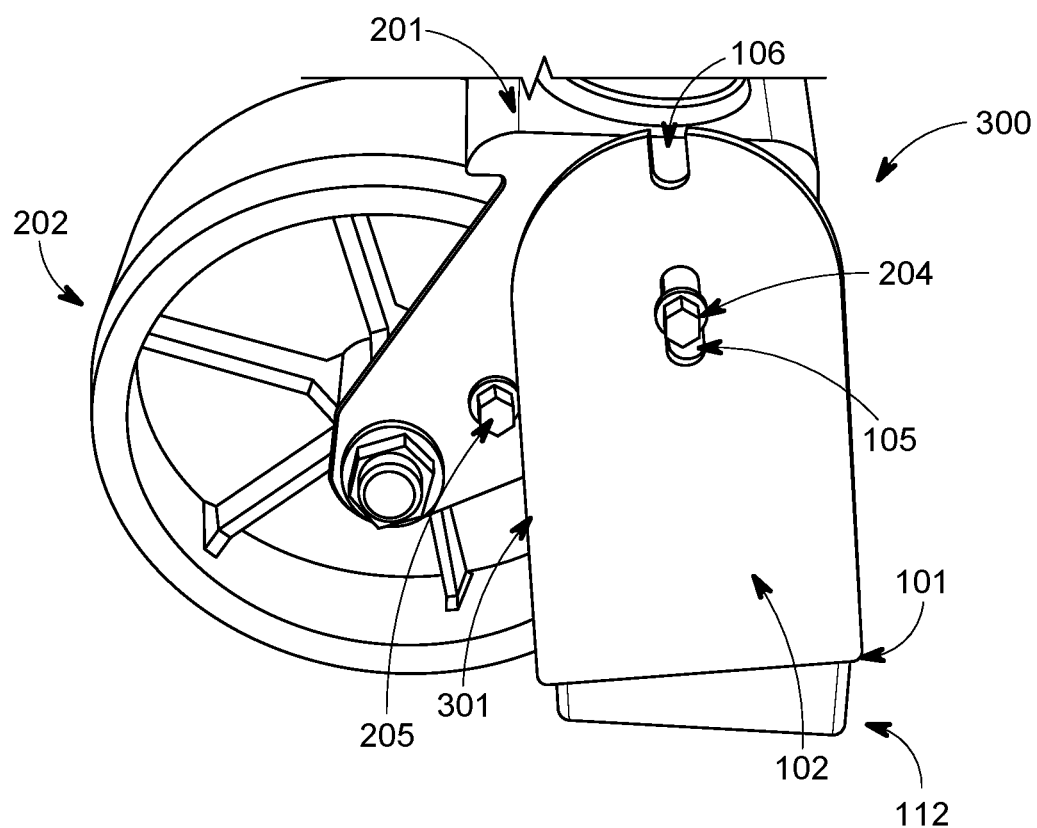
FIG. 3 is a view of a third aspect of a trailer parking brake coupled to a tongue jack wheel and engaged in a braking position, according to the disclosure.

FIG. 3 shows a third aspect of a trailer brake 200 where the trailer brake 200 is coupled to the tongue jack 201 and wheel 202, and where the trailer brake 200 is positioned so that the brake pad 112 is secured against the ground to brake the tongue jack 201 and wheel 202 from movement. The trailer brake 200 is pivoted clockwise as depicted in FIG. 3 such that the trailer brake pad 112 is brought in contact with the ground securely. The armatures of the brake are at rest against retaining bolts 205 and 210 preventing motion of the trailer brake armature leading edge 301 and consequently, movement of the trailer brake 200. Connecting bolts are permanently installed to connect the brake to the jack and are not removed during operation. Locking nuts for these bolts are installed on the inside of the wheel assembly fork.

Figure 4:
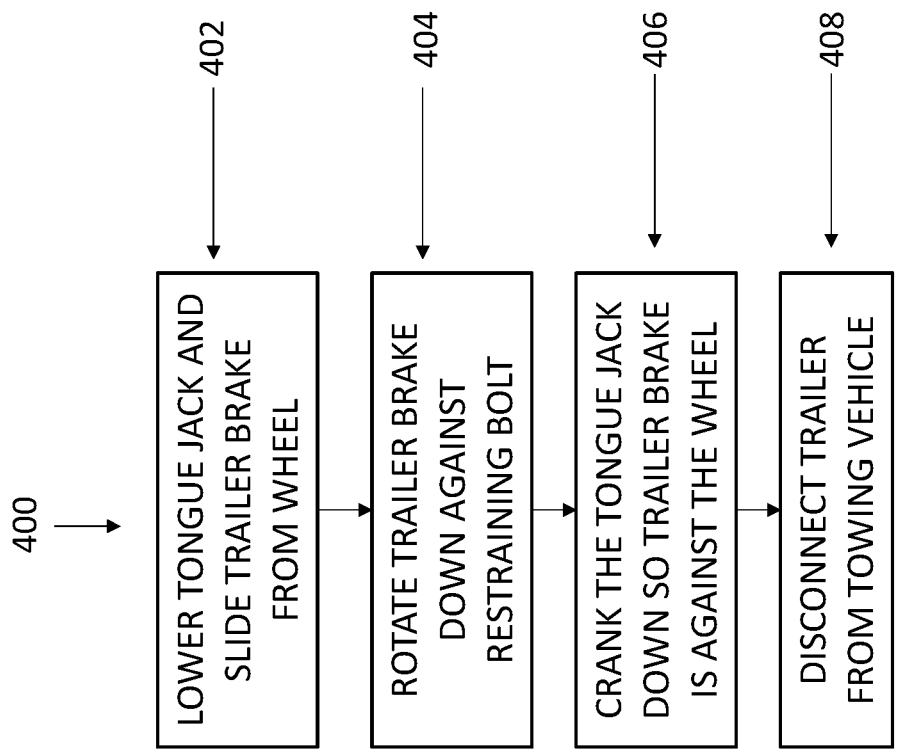
FIG. 4 is a process flow of acts taken to use a trailer parking brake, according to the disclosure.

FIG. 4 illustrates acts taken in a method 400 to use a tongue jack wheel with a trailer brake, according to an aspect of the disclosure.

At act 402, lower the tongue jack 201 (still attached to a towing vehicle) and slide the trailer brake 200 away from the wheel using the first connection slot 105 and the second connection slot 110, which are attached with connecting bolts 105 and 106 on the distal side This removes the retaining slot 106 and retaining slot 111 from the retaining bolts 205 and 210.

At act 404, rotate the trailer brake 200 down against the first and second retaining bolts 205 and 210.

At act 406, crank the tongue jack 201 all the way down, making sure trailer brake 300 is fully against the wheel assembly 202.

At act 408, disconnect the trailer from the towing vehicle.

To disengage the brake, the following acts are taken:

First, attach the trailer to the towing vehicle. Crank the tongue jack 201 up a small amount, reach down and rotate the trailer brake 200 up to the disengaged position using the first connection slot 105 and the second connection slot 110. Slide the first retaining slot 106 onto retaining bolt 205 and second retaining slot 111 onto the retaining bolt 210.

While various aspects of the disclosure have been described, it will be apparent to those of ordinary skill in the art that many more aspects and implementations are possible within the scope of the disclosure. Accordingly, the disclosure is not to be restricted except in light of the attached claims and their equivalents.

What is claimed is:

1. A trailer parking brake for securing a trailer with a tongue jack and a wheel assembly, comprising:
    a brake base for the trailer parking brake;
    a first brake armature and a second brake armature, where the first brake armature and the second brake armature are in communication with the brake base,
    where the first brake armature comprises:
        a first substantially straight side portion and a second substantially straight side portion on either side of the first brake armature and a first substantially semi-circular portion along a top edge of the first brake armature joining the first substantially straight side portion and the second substantially straight side portion; and
        a first connection slot within a body of the first brake armature and a first retaining slot disposed along an edge of the first substantially semi-circular portion, where the first retaining slot impinges into the body of the first brake armature to form an aperture within the first brake armature, the first connection slot configured to receive a first connection bolt for securing the trailer parking brake to the tongue jack, the first retaining slot configured to receive the first retaining bolt; and
    where the second brake armature comprises:
        a third substantially straight side portion and a fourth substantially straight side portion on either side of the second brake armature and a second substantially semi-circular portion along a top edge of the second brake armature, joining the third substantially straight side portion and the fourth substantially straight side portion;
        a second connection slot within a body of the second brake armature and a second retaining slot disposed along an edge of the second substantially semi-circular portion, where the second retaining slot impinges into the body of the second brake armature to form an aperture within the second brake armature, the second connection slot configured to receive the second connection bolt for securing the trailer parking brake to the tongue jack, the second retaining slot configured to receive a second retaining bolt;
    a trailer brake pad in communication with the brake base, where the trailer parking brake is in an upward position when the trailer brake pad is in a disengaged position, and the trailer parking brake is a downward position with the trailer brake pad in communication with a surface to secure the tongue jack and wheel assembly from movement.

2. The trailer parking brake of claim 1, where the trailer brake pad is formed as a triangular wedge shape.

3. The trailer parking brake of claim 1, where the trailer brake pad comprises a rigid rubber material.

4. The trailer parking brake of claim 1, where the first connection bolt extends through one side of the wheel housing on the tongue jack and the first connection bolt is coupled to a lock nut at the opposite side of the first connection bolt.

5. The trailer parking brake of claim 4, where the trailer parking brake is pivoted from the upward position to the downward position by sliding the retaining slots away from the retaining bolts on the wheel.

6. The trailer parking brake of claim 5, where, when the trailer parking brake is in the downward position, the tongue jack is cranked up until the trailer brake can be manually rotated using the connection slots and the retaining slots slide onto the retaining bolts.

7. The trailer parking brake of claim 1, where the brake base, the first brake armature and the second brake armature are composed of 16 gauge steel material.

8. An article of manufacture, comprising:
a brake base for a trailer parking brake configured to secure a tongue jack and a wheel assembly of a trailer;
a first brake armature and a second brake armature, where the first brake armature and the second brake armature are in communication with the brake base,
where the first brake armature comprises:
a first substantially straight side portion and a second substantially straight side portion on either side of the first brake armature and a first substantially semi-circular portion along a top edge of the first brake armature joining the first substantially straight side portion and the second substantially straight side portion; and
a first connection slot within a body of the first brake armature and a first retaining slot disposed along an edge of the first substantially semi-circular portion, where the first retaining slot impinges into the body of the first brake armature to form an aperture within the first brake armature, the first connection slot configured to receive a first connection bolt for securing the trailer parking brake to the wheel housing of the tongue jack, the first retaining slot configured to receive the first retaining bolt; and
where the second brake armature comprises:
a third substantially straight side portion and a fourth substantially straight side portion on either side of the second brake armature and a second substantially semi-circular portion along a top edge of the second brake armature, joining the third substantially straight side portion and the fourth substantially straight side portion;
a second connection slot within a body of the second brake armature and a second retaining slot disposed along an edge of the second substantially semi-circular portion, where the second retaining slot impinges into the body of the second brake armature to form an aperture within the second brake armature, the second connection slot configured to receive the second connection bolt for securing the trailer parking brake to the wheel housing of the tongue jack, the second retaining slot configured to receive a second retaining bolt; and
a trailer brake pad in communication with the brake base, where the trailer parking brake is in an upward position when the trailer brake pad is in a disengaged position, or the trailer parking brake is in a downward position with the trailer brake pad in communication with a surface to secure the tongue jack and wheel assembly from movement.

9. The article of manufacture of claim 8, where the trailer brake pad is formed as a triangular wedge shape.

10. The article of manufacture of claim 9, where the trailer brake pad comprises a rigid rubber material.

11. The article of manufacture of claim 9, where the first connection bolt extends through the wheel housing of the tongue jack and the first connection bolt is coupled to a lock nut on the opposite side of the first connection bolt.

12. The article of manufacture of claim 11, where the trailer parking brake is pivoted from the upward position to the downward position and the retaining slots slide away from the retaining bolts on the wheel.

13. The article of manufacture of claim 12, where, when the trailer parking brake is in the downward position, the tongue jack is cranked up until the trailer brake can be manually rotated using the connection slots and the retaining slots slide onto the retaining bolts.

14. A method for securing a trailer with a tongue jack and a wheel assembly, the method comprising:
providing a trailer parking brake as claimed in claim 1, coupled with a trailer brake pad and coupled to the tongue jack and the wheel assembly and positioned on the trailer brake in an upward position off the ground;
lowering the tongue jack;
sliding the trailer brake away from the wheel assembly using the first connection slot and the second connection slot, which are attached with the first and second connection bolt, sliding the first retaining and the second retaining slot off of the first retaining bolt;
rotating the trailer brake down against the first and second retaining bolt;
cranking the tongue jack completely down to ensure the trailer brake is fully against the wheel assembly; and
disconnecting the trailer from the towing vehicle.

15. The method of claim 14, where the trailer brake pad is formed as a triangular wedge shape.

16. The method of claim 14, where the trailer brake pad comprises a rigid rubber material.

17. The method of claim 14, where the brake base, the first brake armature and the second brake armature are composed of 16 gauge steel material.

* * * * *